United States Patent

[11] 3,599,073

| [72] | Inventors | Arthur W. Wilson<br>Attleboro, Mass.;<br>Bertrand J. Misek, Pawtucket, R.I. |
|---|---|---|
| [21] | Appl. No. | 784,779 |
| [22] | Filed | Dec. 18, 1968 |
| [45] | Patented | Aug. 10, 1971 |
| [73] | Assignee | Texas Instruments Incorporated<br>Dallas, Tex. |

[54] VOLTAGE-REGULATED POWER SUPPLY WITH STANDBY POWER CAPABILITY
7 Claims, 7 Drawing Figs.

[52] U.S. Cl. .................................................. 320/39,
307/48, 307/66, 320/40, 320/46
[51] Int. Cl. ..................................................... H02j 7/10
[50] Field of Search .......................................... 307/44, 48,
64, 66; 320/29, 35, 36, 39, 40, 43, 46

[56] References Cited
UNITED STATES PATENTS

| 2,529,038 | 11/1950 | Medlar et al. | 320/36 |
| 3,123,759 | 3/1964 | Grey | 307/48 UX |
| 3,179,871 | 4/1965 | Bagno | 307/48 UX |
| 3,267,288 | 8/1966 | Maiden et al. | 320/40 X |
| 3,281,640 | 10/1966 | Mas | 320/46 |
| 3,305,725 | 2/1967 | Huge et al. | 307/48 X |
| 3,321,692 | 5/1967 | Walsh | 320/40 |
| 3,365,645 | 1/1968 | Jacobs | 320/DIG. 2 |
| 3,426,263 | 2/1969 | Hennigan et al. | 320/40 X |

Primary Examiner—William M. Shoop, Jr.
Attorneys—Harold Levine, Edward J. Connors, Jr., John A. Haug and James P. McAndrews ABSTRACT: A voltage-regulated power supply with standby power capability particularly adapted for use in data-processing equipment and the like is shown to comprise a sealed, rechargeable battery to be connected across a load for determining load voltage and for cooperating in meeting current demands of the load, a direct current energy source arranged to provide charging current to the battery and to cooperate in meeting the current demands of the load, and control means regulating the charge state of the battery for maintaining load voltage within selected limits.

Inventors:
Arthur W. Wilson,
Bertrand J. Misek,
by James P. McAndrews
Att'y

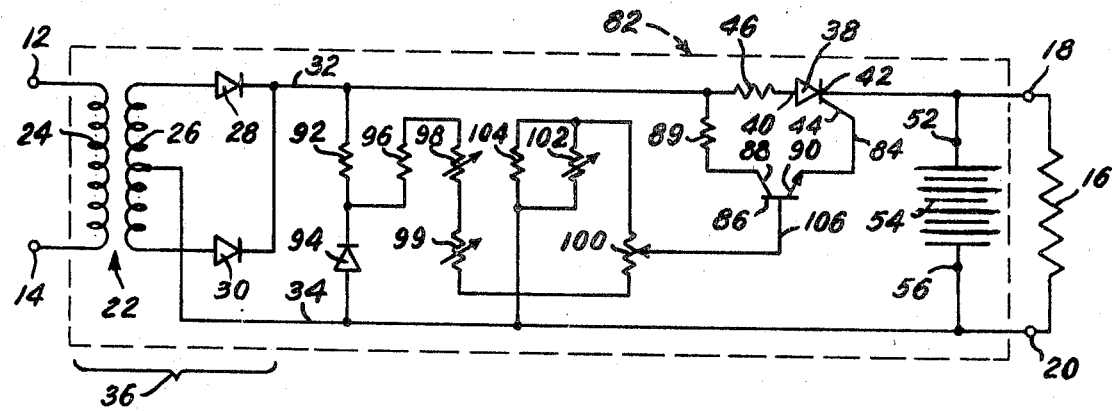
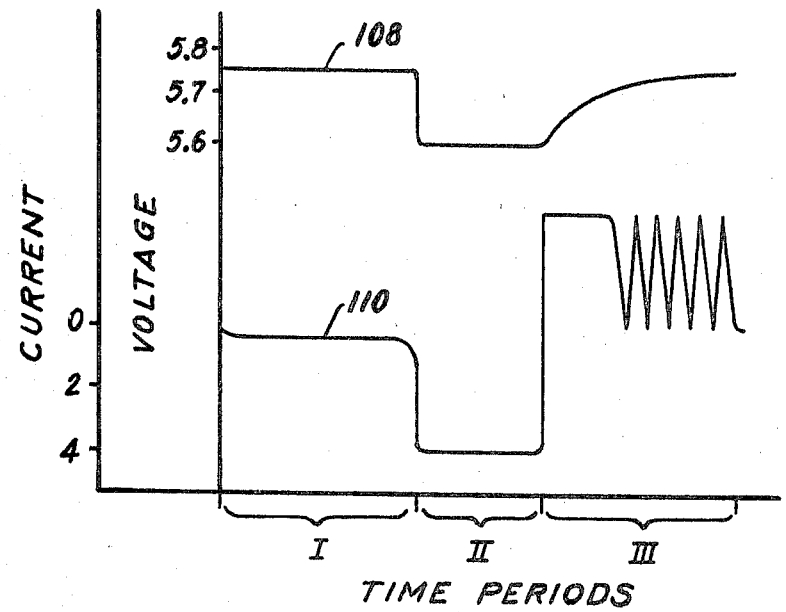

VOLTAGE-REGULATED POWER SUPPLY WITH STANDBY POWER CAPABILITY

In certain data processing equipment and the like in which the current demands of the load are likely to vary widely during equipment operation, the provision of suitable voltage-regulated power supplies presents special problems. For example, such equipment may have a duty cycle in which current demands of the load require 1 ampere for 0.4 seconds, 4 amperes for 0.2 seconds, and 0 amperes for 0.4 seconds, this duty cycle being repeated with occasional variation throughout the period of equipment operation. If conventional voltage-regulated power supply means are used in this application without making special provision for the cyclic current demands, the variations in current demands result in very poor voltage regulation. On the other hand, the provision of a voltage-regulated power supply which has a cyclic current output matched to the load cycle of the equipment is often too costly and complicated for particular applications. In addition, matching of the power supply output to the exact current requirements of the load leaves the power supply unable to handle deviations in the load cycle with adequate voltage regulation. In such data processing equipment and the like, it is also desirable to provide at least a limited standby power capability in a power supply to permit the equipment to complete selected steps in equipment operation in the event of failure of the ultimate power source. If such a standby capability is provided, the equipment is able to resume operation after restoration of the ultimate power source beginning with an operational step following the interrupted step without requiring reinitiation of the entire operational sequence of the equipment.

It is an object of this invention to provide a novel and improved voltage-regulated power supply; to provide such a power supply which is capable of meeting cyclic current demands with good voltage regulation; to provide such a power supply to meet cyclic current demands without requiring exact matching of the power supply output to the load cycle of an equipment; to provide such a power supply which is capable of maintaining good voltage regulation during variations in the load cycle of the equipment in which the power supply is used; to provide such a power supply which has at least a limited standby power capability; and to provide such a power supply which is of economical construction.

Other objects, advantages and details of the voltage-regulated power supply of this invention appear in the following detailed description of preferred embodiments of the invention, the detailed description referring to the drawings in which:

FIG. 6 is a schematic view of an alternate embodiment of the power supply of this invention; and FIG. 7 is a graph illustrating operational characteristics of the power supply of FIG. 6.

Figure 1:
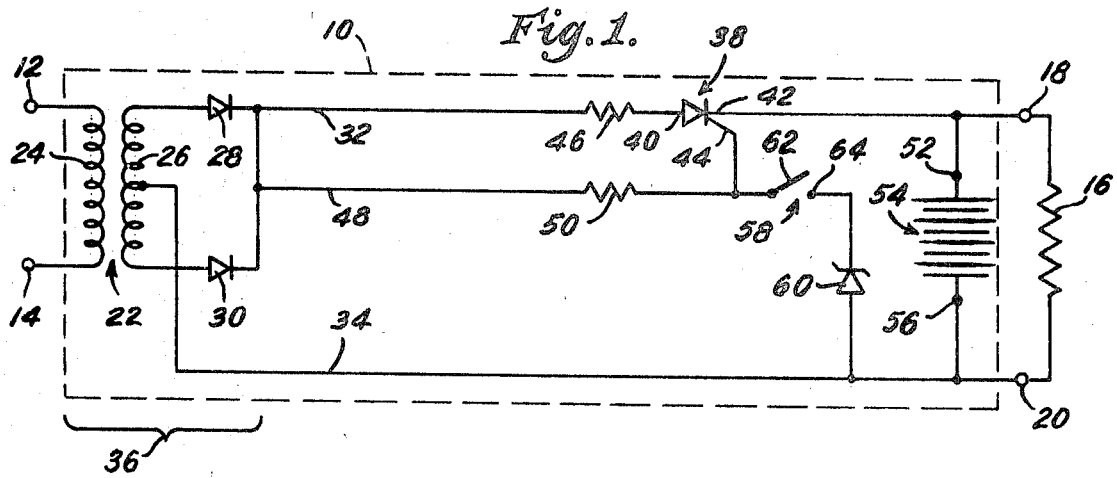
FIG. 1 is a schematic view of a preferred embodiment of the power supply of this invention.

Referring to the drawing, the dotted lines 10 in FIG. 1 indicate the novel and improved power supply of this invention. As illustrated, the power supply 10 is connectable to an alternating current power source by means of the input terminals 12 and 14 and is connectable to a load 16 by the output terminals 18 and 20. The power supply utilizes power furnished by the alternating current source to meet the varying direct current demands of the load while maintaining a steady voltage across the load. The power supply also displays a standby power capability in that the power supply is adapted to meet the power requirements of the load independently of the alternating current source for a limited period of time in the event of failure of the alternating current source.

The power supply 10 includes a transformer 22 having a primary winding 24 which is connected across the alternating current source by means of the input terminals 12 and 14 for receiving power from the alternating current source. The secondary winding 26 of the transformer has its ends connected through respective diodes 28 and 30 to a line 32, the secondary winding being center tapped by another line 34 so that the transformer, diodes and lines cooperate to form a full-wave-rectified direct current source 36 for the power supply.

In accordance with this invention, a control means such as a silicon controlled rectifier (SCR) 38 having an anode 40, a cathode 42, and a gate or control electrode 44, is interposed in series with a current limiting resistor 46 in the line 32. This SCR is arranged for self-triggering operation by means of the line 48 and the current limiting resistor 50 as illustrated in FIG. 1. The cathode of the SCR is connected to a common juncture of the output terminal 18 of the positive terminal 52 of a sealed, rechargeable battery 54, while the line 34 is connected to a common juncture of the output terminal 20 and of the negative terminal 56 of the battery. For example, the battery 54 preferably comprises a sealed rechargeable nickel-cadmium battery. In addition, the gate electrode 44 of the SCR is connected through the switch 58 and the Zener diode 60 to the line 34, the switch 58 having a movable contact 62 and a fixed contact 64 as shown in FIG. 1. In a preferred embodiment of this invention, the switch 58 comprises a pressure sensitive switch of any conventional type arranged to be responsive to internal fluid pressures within the battery 54, the switch being adapted to move to open-contacts position whenever internal battery pressures fall below a selected level and to move to closed-contacts position whenever internal battery pressures increase above a selected higher level.

In this arrangement, by proper selection of the power supply components, the battery 54 is alternately charged and permitted to discharge in cooperating with the power source 36 in meeting the current demands of the load 16. That is, when the battery is in less than fully charged condition while the switch 58 is open, each half-wave cycle of the power source 36 normally renders the SCR 38 conductive during a substantial portion of the half-cycle. In this way, the SCR permits current from the power source 36 to flow to the load or to the battery. When the current conducted through the SCR is insufficient to meet the current requirements of the load, current flows from the battery to meet the load requirement. On the other hand, when the current conducted by the SCR is more than sufficient to meet the load current requirement, current flows to the battery for increasing the charge level of the battery. The battery serves to dampen ripples resulting from the direct current source and regulates the voltage applied to the load 16 in accordance with the charge level of the battery. When the battery charge level tends to increase beyond certain limits, the switch 58, which monitors the internal pressure of the battery as an indication of battery charge level, closes to limit conduction through the SCR until such time as the battery charge level decreases. When the battery charge level tends to fall below certain limits, the switch 58 reopens to permit resumption of charging of the battery. The battery 54 further serves to meet the power requirements of load for a limited period of time independently of the power source 36 in the event of failure of the alternating current power source.

In this regard, it will be understood that a sealed, rechargeable, nickel-cadmium battery is characterized by a battery potential which varies only slightly as the charge level of the battery varies between substantially fully charged condition and 50 percent of full charge level or less. If charging of the battery is continued when the battery is substantially fully charged, gasses are evolved inside the battery to increase internal battery pressures. On the other hand, such gasses continuously recombine with the chemical materials of the battery tending to reduce internal battery pressures.

Figure 2:
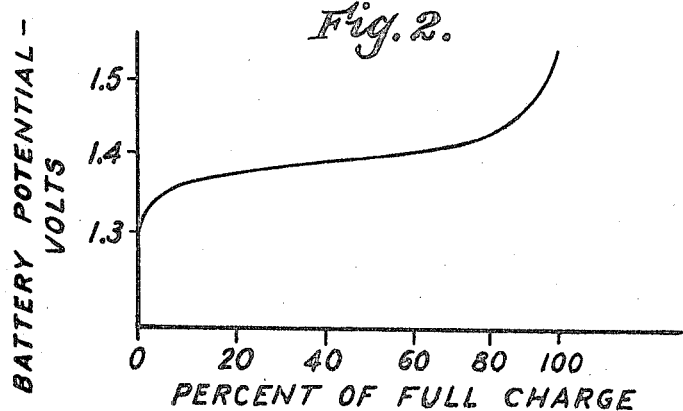
FIG. 2 is a graph illustrating charging characteristics of the battery incorporated in the power supply of FIG. 1.

That is, as shown by the curve in FIG. 2, a sealed rechargeable nickel-cadmium battery has a terminal voltage which rises rapidly from about 1.30 to about 1.40 volts per cell as the cell is initially charged. The battery potential remains at about 1.40 volts per cell with only a small voltage rise as charging continues until the cell is substantially fully charged. Near full charge level, the battery potential rises rapidly toward about 1.50 volts per cell, this rise in potential being associated with the evolution of oxygen gas within the battery. The discharge characteristics of the battery are similar to their charging characteristics. That is, at the initiation of discharge, the cell voltage drops rapidly toward about 1.40 volts per cell as gasses within the cell are recombined with the chemical materials of the cell. The battery potential then remains in the range of about 1.40 to 1.10 volts per cell throughout most of the discharge cycle, dropping off rapidly to a lower voltage only as the battery reaches substantially fully discharged condition. The curve of FIG. 2 illustrates only the general shape of the charging and discharging curves of a battery, the actual charging and discharging curves depending upon the specific rate at which the battery is charged or discharged. For example, the formation of oxygen gas within the battery is minimized enabling a maximum charge with minimum increase in battery pressure when a sealed nickel-cadmium battery is charged at a current (as expressed in amperes) equal to approximately two to four times the energy storing capacity of the battery (as expressed in ampere-hours).

Because of these characteristics of sealed rechargeable batteries, in the arrangement shown, the power supply 10 is able to meet the cyclic current demands of a load 16 with good load voltage regulation. That is, assuming the battery is almost fully charged and has low internal pressure so that the switch 58 is open, a sufficient gate-to-cathode potential difference is established during each half-wave cycle of the power source 36 to render the SCR 38 conductive at the beginning of the half cycle and to apply a direct current pulse to the battery and to load 16. The SCR then becomes nonconductive as the current falls to zero near the end of each half cycle. In this way, while the switch 58 remains open, a series of direct current pulses are applied to the battery and the load. The battery substantially dampens ripples received from the power source, and the voltage across the load is determined by the battery potential which is close to full battery potential. The current demands of the load during this period are supplied by the battery and the power source 36 in cooperation with each other. Current furnished by the direct current pulses in excess of the current requirements of the load serves to charge the battery, gradually raising the battery to fully charged condition and then causing evolution of gasses inside the battery.

As the SCR 38 continues to conduct during each direct current pulse, after the battery reaches full charge level, oxygen is evolved within the battery and internal battery pressure increases until the switch 58 closes. Voltage in the gate circuit of the SCR then cannot exceed the reference voltage established by the Zener diode 60. This reference voltage is selected so that, when the battery is in fully charged condition with the switch 58 closed, the battery potential is normally high enough to prevent the establishment of a sufficient gate-to-cathode potential difference to render the SCR 38 conductive during succeeding half-wave cycles of the power source 36. As a result, the SCR does not conduct for a time and the current requirements of the load during this period are supplied entirely by the battery 54. The voltage across the load during this time is established by the battery potential which varies only a slight degree from full battery potential.

While the switch 58 remains closed, the battery 54 is gradually discharged in meeting the current demands of the load and the gasses within the battery are recombined to reduce internal battery pressure. Whenever battery potential is lowered to a selected level, in response to selected lowering of the battery charge level while the switch 58 is closed so that a sufficient potential difference is established between the gate 44 and the cathode 42 of the SCR 38, the SCR becomes conductive periodically during succeeding half-wave cycles of the power source, thereby to supply occasional charging pulses to the battery to maintain the battery at the selected minimum charge level. Thus the voltage across the load, determined by the battery potential, does not fall below the battery potential corresponding to this selected minimum charge level of the battery. Then, when the recombination of gasses within the battery reduces internal battery pressures to the point where the switch 58 opens, the Zener diode 60 is disconnected from the gate circuit of the SCR permitting the SCR to be self-triggered conductive during each succeeding half-wave cycle of the power source, thereby to reinitiate charging of the battery to fully charged condition. In this way, the power supply 10 is able to meet the cyclic current demands of the load 16, including demands which may occur during deviations from the normal load cycle, while maintaining close regulation of the load voltage.

For example, normal operation of data processing equipment or the like may require a repetitive load cycle of 10 seconds divided into three periods having durations and current requirements as follows:

| PERIOD | DURATION | CURRENT REQUIREMENT |
|---|---|---|
| I | 0.4 sec. | 2.0 amp. |
| II | 0.2 sec. | 4.0 amp. |
| III | 0.4 sec. | 0 amp. |

For this application, the power supply 10 preferably incorporates a 25.2-volt r.m.s., center-tapped transformer providing 2 amperes maximum current at the center tap, the transformer being connected to a standard 110-volt, 60-cycle, alternating current power source by means of the terminals 12 and 14. The diodes 28 and 30 are 100 P.I.V., 2-ampere diodes; resistors 46 and 50 display 3 ohms and 270 ohms resistance respectively; the Zener diode 60 provides a reference voltage of 6.2 volts when back biased as shown; SCR 38 requires a gate-to-cathode potential difference of 0.8 volts to be rendered conductive; and the battery 54 comprises a sealed, rechargeable, four-cell, 0.6-ampere hour capacity nickel-cadmium battery having a nominal voltage of 1.25 volts per cell and a full charge voltage of 1.50 volts per cell. The switch 58 is normally open, pressure sensitive switch which closes in response to an internal battery pressure of 20 pounds per square inch and which reopens when internal battery pressure falls below 10 pounds per square inch.

Figure 3:
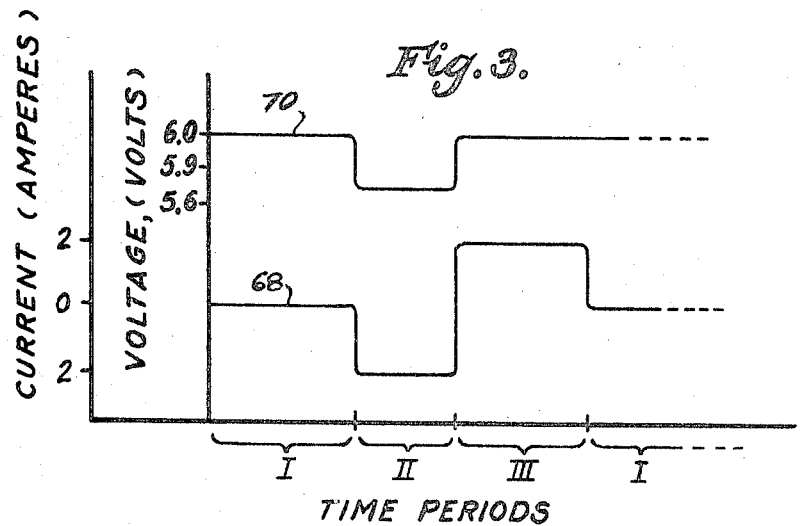
FIGS. 3 and 4 are graphs illustrating operational characteristics of the power supply of FIG. 1.

In this arrangement, when the battery 54 is almost fully charged to display 6-volts potential with the switch 58 open and with internal battery pressure below 20 pounds per square inch, the battery receives current from the power source 36 or furnishes current to the load 16 during periods of the load cycle as illustrated by curve 68 in FIG. 3, the battery potential (and therefore the voltage across the load 16) during the periods of the load cycle being illustrated by curve 70 in FIG. 3. Where curve 68 indicates current below the zero point on the current scale of FIG. 3, the current is delivered to the load from the battery, whereas current indicated by curve 68 above the zero point of the scale indicates current furnished to the battery by the power source. During Period I, the load 16 draws 2 amps and current source 36 provides a maximum 2 amps DC full-wave-rectified current. Thus during Period I, battery 54 supplies a very small current to load 16 to make up the difference between the 2 amps DC load requirement and the DC full-wave-rectified current supplied by power source 36. At this minimal discharge rate the fully charged battery provides essentially a 6 volts average DC voltage to load 16 with r.m.s. ripple of about 2—5 percent. Note that the filtering characteristics of a Ni-Cd battery help to dampen the ripple that would otherwise be caused by the rectified current of current source 36. Thus, during Period I, load 16 receives 2 amps DC current and a 6-volt average DC voltage while battery 54 discharges only negligibly.

During Period II of the load cycle, load 16 draws 4 amps and current source 36 again provides 2 amps DC full-wave-rectified current. Battery 54 provides the remainder of the required current, approximately 2 amps. At this discharge rate, for 0.2 second, a fully charged Ni-Cd battery such as battery 54 provides approximately 5.8 to 5.9 volts average DC voltage to load 16. That is, during Period II load 16 receives 4 amps DC current at 5.8 to 5.9 volts DC voltage, and battery 54 discharges 0.4 coulombs.

During Period III, load 16 draws 0 amps. Power source 36, however, provides 2 amps DC full-wave-rectified current during Period III and this current is received by battery 54 for charging the battery. Thus, for the 0.4 second of Period III, the battery charges by approximately 0.8 coulombs. It is to be noted that the charging rate for the battery 54 during Period III is 2 amps, a charging rate within the 1.2 to 2.4 amps optimum charging rate range for the battery. Thus, over the entire 1-second load cycle, the battery gains a charge of about 0.8 coulomb (Period III) and loses about 0.4 coulombs (Period II), for a total gain of about 0.4 coulombs. The battery thus gains about 0.4 coulombs at each repetition of the load cycle and gradually increases its charge level.

Figure 4:
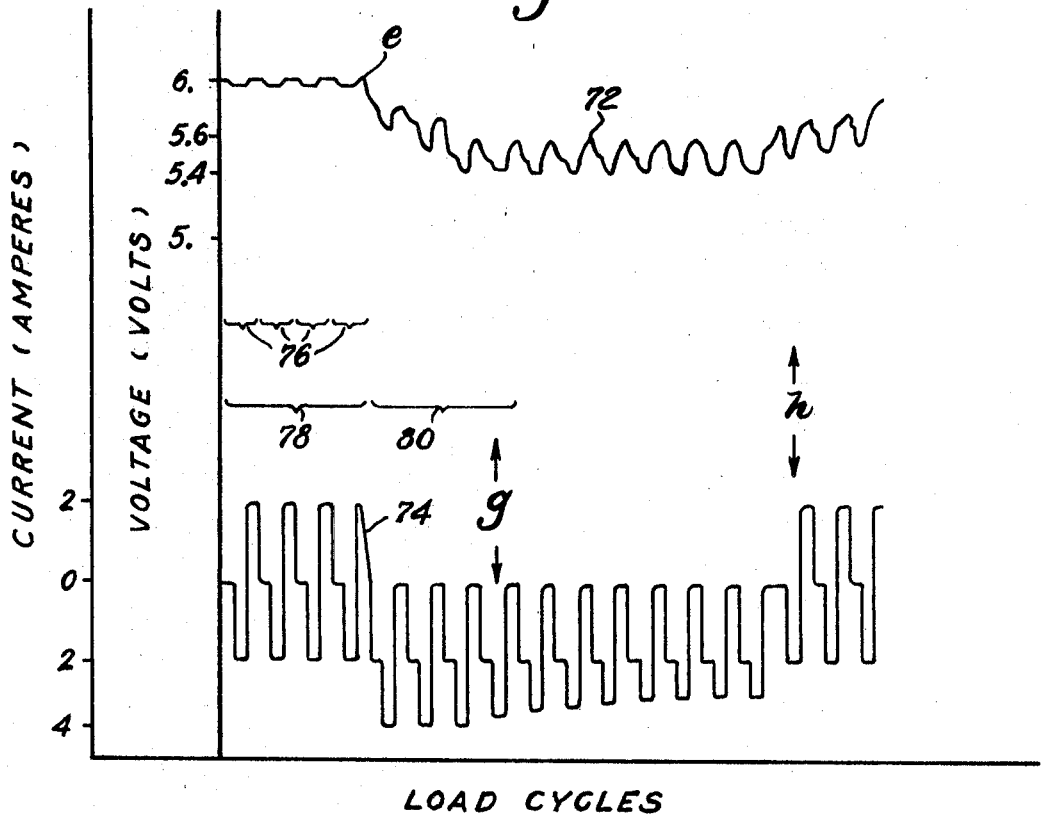

As charging of the battery continues in this manner, the battery reaches full charge level and begins to evolve oxygen at the positive battery electrode, thereby gradually increasing the internal battery pressure. Then, when this internal pressure builds up to 20 pounds per square inch, normally open pressure-sensitive switch 58 closes. Upon closing of the switch, the gate terminal of the SCR is immediately limited to the 6.2 Zener reference voltage and the gate-to-cathode voltage of the SCR 38 is immediately limited to about 0.2 volts, this voltage equaling the difference between the reference voltage and the battery potential of 6 volts. As this gate-to-cathode voltage is less than the 0.8 volts required to render the SCR conductive, the SCR is locked in a nonconductive state. That is, as illustrated in FIG. 4 wherein curve 72 represents battery terminal voltage and curve 74 represents current flow to and from the battery, the terminal voltage of the battery remains relatively steady during a series of load cycles indicated at 76 as the battery is charged during portion 78 of the power supply operation in the manner previously described with reference to FIG. 3. Upon closing of the switch 58, however, indicated at e in FIG. 4, the battery immediately begins to discharge and battery potential falls to a level of about 1.4 volts per cell or about 5.6 volts across the battery terminals. Note that, because charging of the battery occurs only during Period III of the load cycle as described with reference to FIG. 3, closing of the switch 58 will usually occur during the Period III portion of a load cycle. The discharge of the battery to about 5.6 volts occurring after closing of the switch 58 can extend over one or more load cycles of the power supply depending upon the duration and current requirements of the load cycle, the discharge being aided by the current drawn from the battery during those load cycles which occur after closing of switch 58. It can also be seen by reference to curve 74 in FIG. 4 that no current flows to the battery during the initial portion of the power supply operation indicated at 80 after closing of the switch 58.

During the portion 80 of operation of the power supply 10, the battery terminal voltage fluctuates to only a small extent with the varying current requirements of the load 16. That is, as the battery discharges, its terminal voltage is lowest during Period II of the load cycle when the current drain is maximum and highest during Period III when the current drain is minimum. Thus, after the initial discharge of the battery to a potential of about 5.6 volts, the battery voltage during Periods I and II of each load cycle begins to drop below 5.6 volts. However, when the battery 10 voltage drops as low as 5.4 volts, this drop permits establishment of a 0.8-volt gate-to-cathode voltage on the SCR 38 and enables self-triggering of SCR 38. SCR 38 then conducts current from power source 36 to battery 54 and to the load 16 during a part of the half-wave cycle of the power source in which this triggering occurs. This pulse of current from power source 36 immediately raises battery terminal voltage above the 5.4-volt level and lowers the gate-to-cathode voltage on SCR 40 to less than 0.8 volt. SCR 38 thus may not be rendered conductive during the following half cycle of the power source. However, if the load cycle is still in Periods I or II during the next half cycle of the power source, the battery 54 voltage will again be low enough to enable SCR 38 to self-trigger during the half cycle. Then, when the load cycle enters Period III, the next half cycle of the power source finds the battery terminal voltage above 5.4 volts and SCR 38 remains nonconductive.

Figure 5:
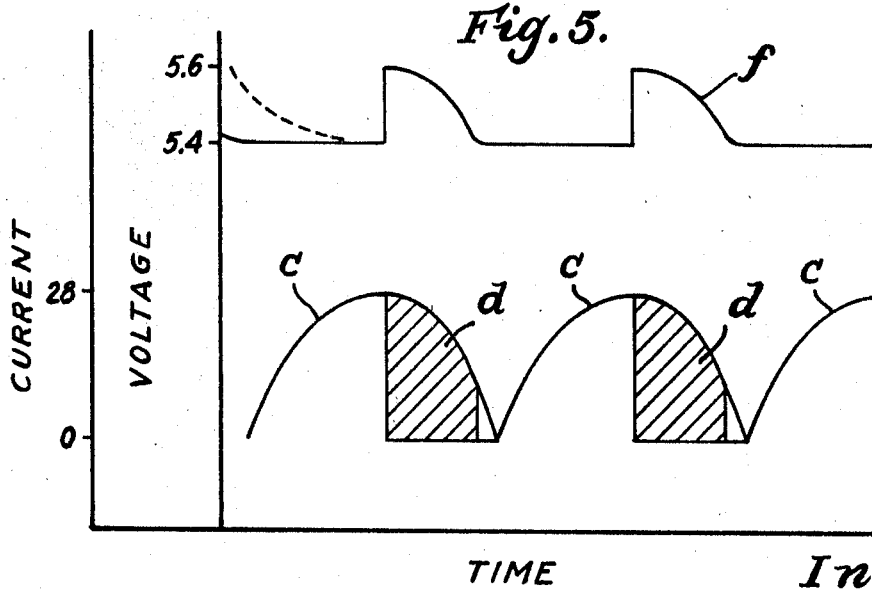
FIG. 5 is a graph illustrating discharging characteristics of the power supply of FIG. 1.

This on-again-off-again action of SCR 38 is illustrated in the diagram of FIG. 5 in which curve c represents the power source current, d represents the portion of each half-wave cycle of the power source during which current is conducted by SCR 38, and curve f represents the terminal voltage of battery during a Period I or II portion of one load cycle. As the terminal voltage of battery drops below 5.4 volts, the SCR 38 is rendered conductive during part of the half-wave cycle of the power source, current flows to the battery and load, and the battery voltage rises above 5.4 volts and stays above 5.4 volts until SCR 38 goes nonconductive at the end of the half cycle of the power source. On the subsequent half cycle of the power source, self-triggering of SCR 38 is again initially blocked until the battery voltage drops below 5.4 volts and triggering of SCR 38 is again repeated. This alternate blocking and triggering of the SCR 38 creates a condition in which SCR 38 is conducts current to battery and load at a conduction angle which gradually increases to about 90° maximum conduction angle and prevents the regulated voltage to load 16 from dropping below 5.4 volts. This regulation of the load voltage is also evident from the diagram of FIG. 4. At point g of the diagram, the voltage of the battery generally stabilizes at a minimum of about 5.4 volts. It can also be seen in reference to curve 74 in FIG. 4 that, beginning at point g in operation of the power supply 10, the current drawn from battery 54 gradually decreases for a time. This occurs as the conduction angle of SCR 38 increases to the 90° maximum as described with reference to FIG. 5. The current drawn from the battery during end load cycle then stabilizes as the conductive angle of the SCR stabilizes in the manner described. Eventually, as oxygen pressure in the battery drops to 10 p.s.i., the pressure sensitive switch 58 opens and the conduction angle of SCR 38 is again permitted to increase to more than 90° for initiating recharging of the battery 54 in the manner described with reference to FIG. 3. This change is indicated on the diagram of FIG. 4 at point h. As is evident from FIG. 4, the power supply 10 thus maintains battery voltage and charge levels within predetermined limits for closely regulating the voltage applied to the load 16.

If a temporary abnormal load current requirement occurs, the proper voltage is maintained and the required current is supplied to the load. The effect of such an abnormal requirement on the embodiment is only to alter the duration of the charging and discharging processes during the period of the abnormal requirement.

The present invention, as illustrated in the embodiment of FIG. 1, is not susceptible to thermal runaway. By selecting a proper Zener diode 60 back bias voltage and proper triggering pressures for switch 58, the rest time of the battery between charging periods is sufficiently long to insure dissipation of the heat generated during each charging period. The choice of Zener diode 60 back bias voltage depends upon the terminal voltage of the battery 54 and the (gate-to-cathode triggering voltage of SCR 38. The back bias voltage should be chosen sufficiently low to insure discharge period long enough to aid in heat dissipation from the battery. In selecting triggering pressures for switch 58 it is recommended that the reset pressure be 50 percent or less of the trip pressure. To insure against ambient temperature effects upon Zener diode 60, thermally compensating means may be employed for adjusting the Zener reference voltage where large variations in ambient temperature are expected.

As noted above, the battery characteristic monitored in the power supply 10 shown in FIG. 1 is the internal oxygen pressure. Other battery characteristics are also indicative of the charge state of the battery. For example, because of the production and recombination of oxygen gas during the final stages of charging is an exothermic process, the internal temperature of the battery also serves as an indication of the charge state of the battery. A rise in battery temperature indicates that the battery is charged to the level at which oxygen generation and recombination is taking place.

An embodiment of the voltage-regulated power supply of the present invention in which the internal temperature of the battery is monitored as an indicator of battery charge state is illustrated within the broken lines 82 in FIG. 6. In this embodiment, as in the embodiment of FIG. 1, battery 54 regulates voltage to load 16 while cooperating with power source 36 to provide current to the load. The power source provides current for the load and also charges battery 54. Also as in the embodiment of Fig. 1, SCR 38 controls the flow of current from the power source 36 to the battery 54 and load 16. However, in the embodiment of FIG. 6 the self-triggering of SCR 38 is controlled with respect to the internal temperature of battery 54.

That is, as shown in FIG. 6, SCR 38 is arranged for self-triggering operation in the line 32 by means of line 84 and transistor 86, the transistor having its base terminal 88 connected to line 32 at the anode side of SCR 38 through resistor 89, and its emitter terminal 90 connected to the gate terminal 44 of SCR 38. Gate current can thus flow to SCR 38 only when transistor 86 is conductive. Resistor 92 and Zener diode 94 are connected in serial across the power source 36. Zener diode 94 is connected by its anode terminal to line 34 so that it provides a voltage reference level at its cathode terminal equal to its back bias voltage. Resistor 96 is connected in series with thermistors 98 and 99, with potentiometer 100, and with the parallel combination of thermistor 102 and resistor 104 between the juncture of diode 94 and resistor 92 and the line 34. Thermistor 98 displays a positive temperature coefficient of resistivity and thermistor 99 displays a negative temperature coefficient, these thermistors being placed to be sensitive to and to compensate for changes in ambient temperature in the power supply. That is, these thermistors are selected to cooperate in providing an increase in resistance in series with the potentiometer 100 corresponding to an increase in the ambient temperature of the power supply, thereby to assure proper functioning of transistor 85 and SCR 38 in regulating operation of the power supply. In this way, where the transistor 86 and SCR 38 are adapted to be rendered conductive with lower voltages at the potentiometer tap when ambient temperature increases, the thermistor 102 introduces a decrease in resistance in the potentiometer circuit to assure that transistor 86 and SCR 38 are rendered conductive in response to the same battery temperature regardless of the level of the ambient temperature. Thermistor 99 which has a positive temperature coefficient of resistivity is located close to the battery 54 to be sensitive to the internal temperature of battery. The tap terminal of potentiometer 100 is connected to the base terminal 102 of transistor 86.

For example, where the power supply 82 is used in equipment having a duty cycle as previously described with reference to FIG. 3, the power supply 82 preferably incorporates a transformer 22, diodes 28 and 30, SCR 38, resistor 46 and a battery 54 as in the specific example previously described. The power supply 82 further incorporates resistors 89, 92, 96 and 104 of 470 ohms, 100 ohms, and 180 ohms and 3300 ohms resistance respectively. The Zener diode 94 comprises a 10-volt, 1-watt Zener; the transistor is 5-watt, 700-milliamp NPN transistor of the type commonly identified by Cat. No. 2N3053, and the thermistors 98, 99 and 102 are formed of semiconducting materials or the like having selected resistance properties which vary with temperature in the manner indicated.

In this arrangement, when the battery 54 is in less than fully charged condition, the Zener diode 94 limits the voltage applied to the potentiometer circuit but the voltage at the tap of the potentiometer 100 during each half-wave cycle of the power source 36 is normally sufficient to render the transistor 86 conductive to permit self-triggering of the SCR 38 for applying a current pulse to the battery 54 and load 16. In this situation, the battery 54 and the power source 36 cooperate in meeting the current requirements of the load in the manner previously described with reference to FIG. 3. However, as the battery becomes fully charged so that oxygen gas is evolved and recombined within the battery in an exothermic reaction, the thermistor 99 senses a change in battery temperature, increases in resistance, and lowers the voltage at the potentiometer tap so that the transistor 86 is no longer rendered conductive during subsequent half-wave cycles of the power source 36. The SCR 38 is therefore locked in a nonconductive state for a period of time until the battery cools sufficiently for permitting the resistance of thermistor 102 to increase to a level which again renders the transistor 86 and the SCR 38 conductive. The power supply 82 will then tend to stabilize in its operation to maintain the battery charge level at a point where oxygen evolution and recombination within the battery heats thermistor 102 to approximately the temperature at which the thermistor prevents conduction by transistor 86. That is, during Periods I and II of the load cycle, as illustrated in FIG. 7 wherein curve 108 illustrates the battery potential and curve 110 illustrates the current flow to and from the battery during a load cycle of the power supply 82, load current is supplied partly by the battery 54 so that no charging of the battery and no evolution of oxygen within the battery can occur. During these Periods, the battery potential varies between about 5.50 and 5.65 volts as illustrated in FIG. 7 so that load voltage is regulated within these limits. However, when the power supply enters Period III in the load cycle, charging current is initially applied to the battery causing evolution of oxygen therein and increase in battery temperature and causing increase in resistance in thermistor 99. This increase in resistance lowers voltage at the potentiometer tap so that the SCR stops conducting for a period of time until, with cooling of the battery, the resistance of thermistor 102 increases slightly. In this way, the power supply 82 tends to operate with the battery somewhat heated near full charge level and with the thermistor 99 heated to a temperature which permits shifting of the transistor 86 between conducting and nonconducting states in response to very brief periods of oxygen evolution or the absence of oxygen evolution in the battery 54. Thus the power supply 82 is able to provide very close regulation of the voltage applied to the load 16.

It can be seen that the power supplies 10 and 82 provided by this reaction are each of relatively inexpensive design but that each of the power supplies is adapted to provide good load voltage regulation even when the load cycle is characterized by widely varying current requirements during the load cycle. The power supplies are also capable of maintaining good voltage regulation during variations from the normal load cycle. The power supplies are further protected against risk of thermal runaway in the batteries incorporated in the power supplies. That is, in the power supply 10, the settings of the switch 58 are easily regulated to assure that charging of the battery is terminated before the battery becomes overheated and to assure that the battery is properly cooled after termination of charging before battery charging is resumed. The power supply 82, in providing a positive temperature coefficient thermistor responsive to battery temperature inherently provides protection against overheating of the battery 54 in the power supply. In addition, both power supplies incorporate a battery which is normally in substantially charged condition and which is therefore capable of meeting the current requirements of a load for at least a limited period of time independently of the ultimate power source, thereby providing the power supply with a significant standby power capability.

It should be understood that although particular embodiments of the power supply of this invention have been described by way of illustration, this invention includes all modifications and equivalents thereof which fall within the scope of the appended claims.

We claim:

1. A voltage-regulated electrical power supply comprising a sealed rechargeable battery having a pair of terminals connectable to a load for furnishing direct current to said load at a voltage which varies with the charge storage level of said battery, a transformer having a primary winding connectable across an alternating current source and having a secondary winding with a center tap therein connected to one of said battery terminals, a pair of diodes connected to the respective ends of said secondary winding for furnishing direct current pulses when said primary winding is connected across said alternating current source, a silicon-controlled rectifier interposed between said diodes and the other of said battery terminals, said rectifier having a control electrode arranged to normally render said rectifier conductive in response to said pulses to apply full-wave-rectified current to said other battery terminal for charging said battery and for cooperating with said battery in furnishing direct current to said load, a Zener diode connectable between said control electrode and said secondary winding tap for preventing conduction by said rectifier when said battery charge storage level is above a first limit, and a pressure-sensitive switch responsive to the internal fluid pressure in said battery for connecting said Zener diode between said control electrode and secondary winding tap when said battery pressure uses above a first level and for disconnecting said Zener diode from between said control electrode and secondary winding tap when said battery pressure thereafter falls below a second lower level, thereby to maintain the charge storage level of said battery within selected limits.

2. A power supply as set forth in claim 1 wherein said battery comprises a nickel-cadmium battery.

3. A voltage-regulated electrical power supply comprising a sealed rechargeable battery having a pair of terminals connectable to a load for furnishing direct current to said load at a voltage which varies with the charge storage level of said battery, a transformer having a primary winding connectable across an alternating current source and having a secondary winding with a center tap therein connected to one of said battery terminals, a pair of diodes connected to the respective ends of said secondary winding for furnishing direct current pulses when said primary winding is connected across said alternating current source, a silicon-controlled rectifier interposed between said diodes and the other said battery terminals, said rectifier having a control electrode, a transistor arranged in series with said control electrode and adapted to be rendering conductive to normally render said rectifier conductive in response to said direct current pulses to apply full-wave-rectified direct current to said other battery terminal for charging said battery and for cooperating with said battery in furnishing direct current to said load, thermistor means connected between said diodes and said secondary winding tap, and a Zener diode connected in parallel with said thermistor means said thermistor means being responsive to the temperature of said battery to provide a signal rendering said transistor conductive when said battery temperature is below a first selected level and to prevent conduction by said transistor when said battery temperature is above a second higher level, thereby to maintain the charge storage level of said battery within selected limits.

4. A power supply as set forth in claim 3 having additional thermistor means in series with said first-named thermistor means, said additional thermistor means being responsive to the ambient temperature of said rectifier for compensating for changes in operating conditions of said rectifier with changes in said ambient temperature.

5. A power supply as set forth in claim 4 wherein said battery comprises a nickel-cadmium battery.

6. A voltage-regulated electrical power supply comprising sealed rechargeable battery means connectable to a load for furnishing current to said load at a voltage which varies with the charge storage level of said battery means, direct current power source means connectable to an alternating current power source to furnish full-wave-rectified direct current pulses to said battery means for charging said battery means and for cooperating with said battery means in furnishing current to said load, and control means responsive to the charge storage level of said battery means for interrupting furnishing of said direct current pulses to said battery means to maintain said charge storage level thereof within selected limits, said control means comprising semiconducting means interposed between said power source means and said battery means, said semiconducting means having gate circuit means arranged to normally render said semiconducting means conductive in response to said pulses to apply said pulses to said battery means for charging said battery means and for cooperating with said battery means in furnishing direct current to said load, Zener diode means connectable to said gate circuit means for preventing conduction of said semiconducting means when said charge storage level of said battery means is above a first limit, and pressure-sensitive switch means responsive to internal fluid pressure in said battery for connecting said Zener diode means to said gate circuit means when said battery pressure uses above a first level and for disconnecting said Zener diode means from said gate circuit means when said battery pressure thereafter falls below a second lower level.

7. A voltage-regulated electrical power supply comprising sealed rechargeable battery means connectable to a load for furnishing current to said load at a voltage which varies with the charge storage level of said battery means, direct current power source means connectable to an alternating current power source to furnish full-wave-rectified direct current pulses to said battery means for charging said battery means and for cooperating with said battery means in furnishing current to said load, and control means responsive to the charge storage level of said battery means for interrupting furnishing of said direct current pulses to said battery means to maintain said charge storage level thereof within selected limits, said control means comprising semiconducting means interposed between said power source means and said battery means, said semiconducting means having gate circuit means actuable to render said semiconducting means conductive in response to said pulses to apply said pulses to said battery means for charging said battery means and for cooperating with said battery means in furnishing direct current to said load, and thermistor means responsive to the temperature of said battery means for actuating said gate circuit means when said temperature of said battery means is below a first selected level and for preventing actuation of said gate circuit means when said temperature of said battery means is above a second higher level.